(12) United States Patent
Li et al.

(10) Patent No.: US 8,958,322 B2
(45) Date of Patent: Feb. 17, 2015

(54) METHOD, APPARATUS AND SYSTEM FOR AUTHORIZING POLICY AND CHARGING CONTROL RULE

(75) Inventors: Yan Li, Beijing (CN); Shuang Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 13/370,798

(22) Filed: Feb. 10, 2012

(65) Prior Publication Data

US 2012/0140665 A1 Jun. 7, 2012

Related U.S. Application Data

(63) Continuation of application No. PCT/CN2010/075870, filed on Aug. 11, 2010.

(30) Foreign Application Priority Data

Aug. 11, 2009 (CN) .......................... 2009 1 0091177

(51) Int. Cl.
*G01R 31/08* (2006.01)
*H04L 12/911* (2013.01)
*H04L 12/927* (2013.01)
(Continued)

(52) U.S. Cl.
CPC ............ *H04L 47/781* (2013.01); *H04L 47/805* (2013.01); *H04W 72/087* (2013.01); *H04W 72/0413* (2013.01); *H04W 72/0493* (2013.01); *H04W 76/041* (2013.01)
USPC .......................................... 370/252; 370/328

(58) Field of Classification Search
USPC ........................... 370/252, 328, 338, 401, 465
See application file for complete search history.

(56) References Cited

U.S. PATENT DOCUMENTS 7,263,087 B2 * 8/2007 Soininen et al. ............... 370/338
7,787,426 B2 * 8/2010 Seidel et al. ................... 370/338
(Continued)

FOREIGN PATENT DOCUMENTS

CN   101094236 A   12/2007
CN   101188504 A   5/2008
(Continued)

OTHER PUBLICATIONS

Extended European Search Report issued in corresponding European Patent Application No. 10807975.7, mailed Jun. 4, 2012.
(Continued)

*Primary Examiner* — Ricky Ngo
*Assistant Examiner* — Christine Ng
(74) *Attorney, Agent, or Firm* — Brinks Gilson & Lione

(57) ABSTRACT

A method, an apparatus and a system for authorizing a policy and charging control rule are provided. The method includes: receiving a resource allocation request message, where the resource allocation request message indicates that a resource is allocated on a designated bearer; sending ARP information of the designated bearer to a PCRF; and receiving QoS of PCC rule authorized by the PCRF according to the ARP information of the designated bearer, and performing bearer binding according to the QoS of the authorized PCC rule. In the present invention, the PCRF acquires the ARP information of the designated bearer, so that the PCC rule authorized by the PCRF can be bound to the designated bearer, and the user equipment on the designated bearer can be successfully allocated the resource.

9 Claims, 7 Drawing Sheets

(51) Int. Cl.
*H04W 72/08* (2009.01)
*H04W 72/04* (2009.01)
*H04W 76/04* (2009.01)

(56) References Cited

U.S. PATENT DOCUMENTS

| | | | |
|---|---|---|---|
| 8,422,373 B2* | 4/2013 | Alanara | 370/235 |
| 8,531,967 B2* | 9/2013 | Kazmi et al. | 370/236.2 |
| 2010/0017846 A1 | 1/2010 | Huang et al. | |
| 2010/0054253 A1 | 3/2010 | Li | |
| 2010/0157887 A1* | 6/2010 | Kopplin | 370/328 |
| 2011/0238547 A1* | 9/2011 | Belling et al. | 705/34 |
| 2012/0059944 A1* | 3/2012 | Fernandez Alonso et al. | 709/228 |

FOREIGN PATENT DOCUMENTS

| | | |
|---|---|---|
| CN | 101222413 A | 7/2008 |
| CN | 101272256 A | 9/2008 |
| CN | 101374260 A | 2/2009 |
| WO | WO 2008/061477 A1 | 5/2008 |
| WO | WO 2011018030 A1 | 2/2011 |

OTHER PUBLICATIONS

3GPP, "Digital Cellular Telecommunications System (Phase 2+); Universal Mobile Telecommunications System (UMTS); LTE; Policy and Charging Control Architecture" 3GPP TS 23.203 version 8.4.0 Release 8) ETSI TS 123 203. V8.4.0, Jan. 2009.

Written Opinion of the International Searching Authority issued in corresponding PCT Patent Application No. PCT/CN2010/075870, mailed Nov. 18, 2010.

International Search Report issued in corresponding PCT Patent Application No. PCT/CN2010/075870, mailed Nov. 18, 2010.

LTE, "3$^{rd}$ Generation Partnership Project; Technical Specification Group Services and System Aspects; General Packet Radio Service (GPRS); Service Description" Stage 2 (Release 9) 3GPP TS 23.060, V9.11.0, Dec. 2011.

LTE, "3$^{rd}$ Generation Partnership Project; Technical Specification Group Core Network and Terminals; Policy and Charging Control Signalling Flows and Quality of Service (QoS) Parameter Mapping" (Release 9) 3GPP TS 29.213, V9.8.0, Dec. 2011.

LTE, "3$^{rd}$ Generation Partnership Project; Technical Specification Group Core Network and Terminals; Policy and Charging Control Over Rx Reference Point" (Release 9) 3GPP TS 29.214, V9.9.0, Dec. 2011.

LTE, "3$^{rd}$ Generation Partnership Project; Technical Specification Group Core Network and Terminals; Policy and Charging Control (PCC) Over Gx Reference Point" (Release 9) 3GPP TS 29.212, V9.9.0, Dec. 2011.

LTE, "3$^{rd}$ Generation Partnership Project; Technical Specification Group Services and System Aspects; Policy and Charging Control Architecture" (Release 9) 3GPP TS 23.203, V9.10.0, Dec. 2011.

Office Action issued in corresponding Chinese Patent Application No. 200910091177.6, mailed Jul. 3, 2012.

* cited by examiner

METHOD, APPARATUS AND SYSTEM FOR AUTHORIZING POLICY AND CHARGING CONTROL RULE

CROSS-REFERENCE TO RELATED APPLICATIONS

This application is a continuation of International Application No. PCT/CN2010/075870, filed on Aug. 11, 2010, which claims priority to Chinese Patent Application No. 200910091177.6, filed on Aug. 11, 2009, both of which are hereby incorporated by reference in their entireties.

FIELD OF THE INVENTION

The present invention relates to the field of communications technologies, and in particular, to a method, an apparatus and a system for authorizing a policy and charging control rule.

BACKGROUND OF THE INVENTION

In the policy and charging control (Policy and Charging Control, referred to as PCC for short) technology of the 3rd Generation Partnership Project (3GPP) R8, an allocation and retention priority (Allocation and Retention Priority, referred to as ARP for short) parameter is introduced, and bearer binding is performed on QoS class identification (QoS Class Identification, referred to as QCI for short) and the ARP parameter, that is, to ensure that all the PCC rules on one bearer have the same QCI and the same ARP parameter.

When a user equipment (User Equipment, referred to as UE for short) accesses a 2G/3G network and supports a hybrid control mode, the UE may perform a traffic flow template (Traffic Flow Template, referred to as TFT for short) adding operation and a corresponding quality of service (Quality of Service, referred to as QoS for short) operation on a secondary context initiated on the network side; a general packet radio service (General Packet Radio Service, referred to as GPRS for short) service support node (Service GPRS Support Node, referred to as SGSN for short) converts the secondary context into a resource allocation request message and sends the resource allocation request message to a service gateway (Service Gateway, referred to as SGW for short), where the resource allocation request message carries TFT and QoS information, and also carries a bearer ID (Bearer ID) indicating that the resource needs to be created on a designated bearer; the SGW forwards the resource allocation request message to a packet data network gateway (Packet Data Network Gateway, referred to as PGW for short); the PGW initiates an Internet Protocol connectivity access network (Internet Protocol Connectivity Access Network, referred to as IP-CAN for short) session modification message to a policy and charging rule function (Policy and Charging Rule Function, referred to as PCRF for short); and after receiving the IP-CAN session modification message, the PCRF generates a new PCC rule, and meanwhile generates an ARP parameter and QCI corresponding to the new PCC rule, where because the PCRF cannot acquire the bearer ID or acquire the existing PCC rule on the bearer corresponding to the bearer ID, the generated ARP parameter may be different from the ARP parameters of the other PCC rule on the bearer corresponding to the bearer ID. If the ARP parameter of the PCC rule delivered by the PCRF is inconsistent with an ARP parameter on an existing bearer, according to PCC-related specifications in R8, the PGW cannot bind the PCC rule having the different ARP parameter to the same bearer, resulting in failure of the resource allocation request of the UE on the designated bearer.

SUMMARY OF THE INVENTION

Embodiments of the present invention provide a method, an apparatus and a system for authorizing a policy and charging control rule, so that a UE can be successfully allocated a resource on a designated bearer.

An embodiment of the present invention provides a method for authorizing a policy and charging control rule, which includes:

receiving a resource allocation request message, where the resource allocation request message indicates that a resource is allocated on a designated bearer;

sending ARP information of the designated bearer to a PCRF; and receiving QoS of a PCC rule authorized by the PCRF according to the ARP information of the designated bearer, and performing bearer binding according to the QoS of the authorized PCC rule.

An embodiment of the present invention provides an apparatus for implementing a policy and charging rule, which includes:

a first receiving module, configured to receive a resource allocation request message, where the resource allocation request message indicates that a resource is allocated on a designated bearer;

a sending module, configured to send, to a PCRF, ARP information of the designated bearer indicated by the resource allocation request message received by the first receiving module;

a second receiving module, configured to receive QoS of a PCC rule authorized by the PCRF according to the ARP information of the designated bearer sent by the sending module; and a binding module, configured to perform bearer binding according to the QoS of the authorized PCC rule received by the second receiving module.

An embodiment of the present invention provides an apparatus for authorizing a policy and charging rule, which includes:

a receiving module, configured to receive ARP information of a designated bearer sent by a PCEF according to a received resource allocation request message, where the resource allocation request message indicates that a resource is allocated on the designated bearer; and a first sending module, configured to send, to the PCEF, QoS of a PCC rule authorized according to the ARP information of the designated bearer received by the receiving module.

An embodiment of the present invention provides a system for authorizing a policy and charging control rule, which includes the apparatus for implementing a policy and charging rule and the apparatus for authorizing a policy and charging rule.

In the embodiments of the present invention, after the resource allocation request message is received, the ARP information of the designated bearer is sent to the PCRF, and bearer binding is performed according to the QoS of the PCC rule authorized by the PCRF according to the ARP information of the designated bearer. Therefore, the PCRF acquires the ARP information of the designated bearer, so that in the embodiments of the present invention, the PCC rule authorized by the PCRF can be bound to the designated bearer, and the UE on the designated bearer can be successfully allocated the resource.

BRIEF DESCRIPTION OF THE DRAWINGS

To describe the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons skilled in the art can derive other drawings from the accompanying drawings without creative efforts.

DETAILED DESCRIPTION OF THE EMBODIMENTS

The technical solutions in the embodiments of the present invention are further described in detail with reference to the accompanying drawings and embodiments below.

Figure 1:
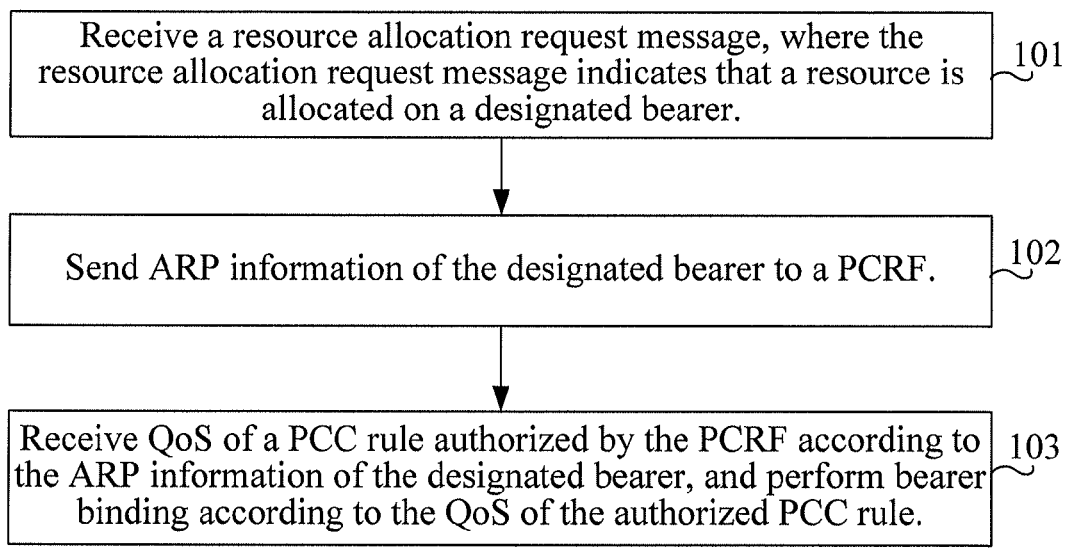
FIG. 1 is a flow chart of Embodiment 1 of a method for authorizing a policy and charging control rule provided by the present invention.

FIG. 1 is a flow chart of Embodiment 1 of a method for authorizing a policy and charging control rule provided by the present invention. Referring to FIG. 1, this embodiment specifically includes the following steps:

Step 101: Receive a resource allocation request message, where the resource allocation request message indicates that a resource is allocated on a designated bearer.

The designated bearer is an already established bearer. A UE in hybrid mode initiates a resource allocation request message on the already established bearer, and a policy and charging enforcement function (Policy and Charging Enforcement Function, referred to as PCEF for short) receives the resource allocation request message, where the resource allocation request message indicates that a resource is allocated on the designated bearer.

Step 102: Send ARP information of the designated bearer to the PCRF.

The PCEF acquires that an operation needs to be performed on the designated bearer according to the resource allocation request message, and sends the ARP information of the designated bearer to a PCRF. The ARP information of the designated bearer is information related to an ARP parameter of the designated bearer, which may specifically be the ARP parameter of the designated bearer or an existing PCC rule in the designated bearer.

Step 103: Receive QoS of a PCC rule authorized by the PCRF according to the ARP information of the designated bearer, and perform bearer binding according to the QoS of the authorized PCC rule.

The PCRF authorizes the PCC rule according to the ARP information of the designated bearer and sends the QoS of the authorized PCC rule to the PCEF, and the PCEF performs bearer binding according to the QoS of the authorized PCC rule.

In this embodiment, the PCEF receives the resource allocation request message and sends the ARP information of the designated bearer to the PCRF, the PCRF authorizes the PCC rule according to the ARP information of the designated bearer, and the PCEF performs bearer binding according to the QoS of the authorized PCC rule. Therefore, the PCRF acquires the ARP information of the designated bearer, so that the PCEF can bind the PCC rule authorized by the PCRF to the designated bearer, and the UE on the designated bearer can be successfully allocated the resource.

Figure 2:
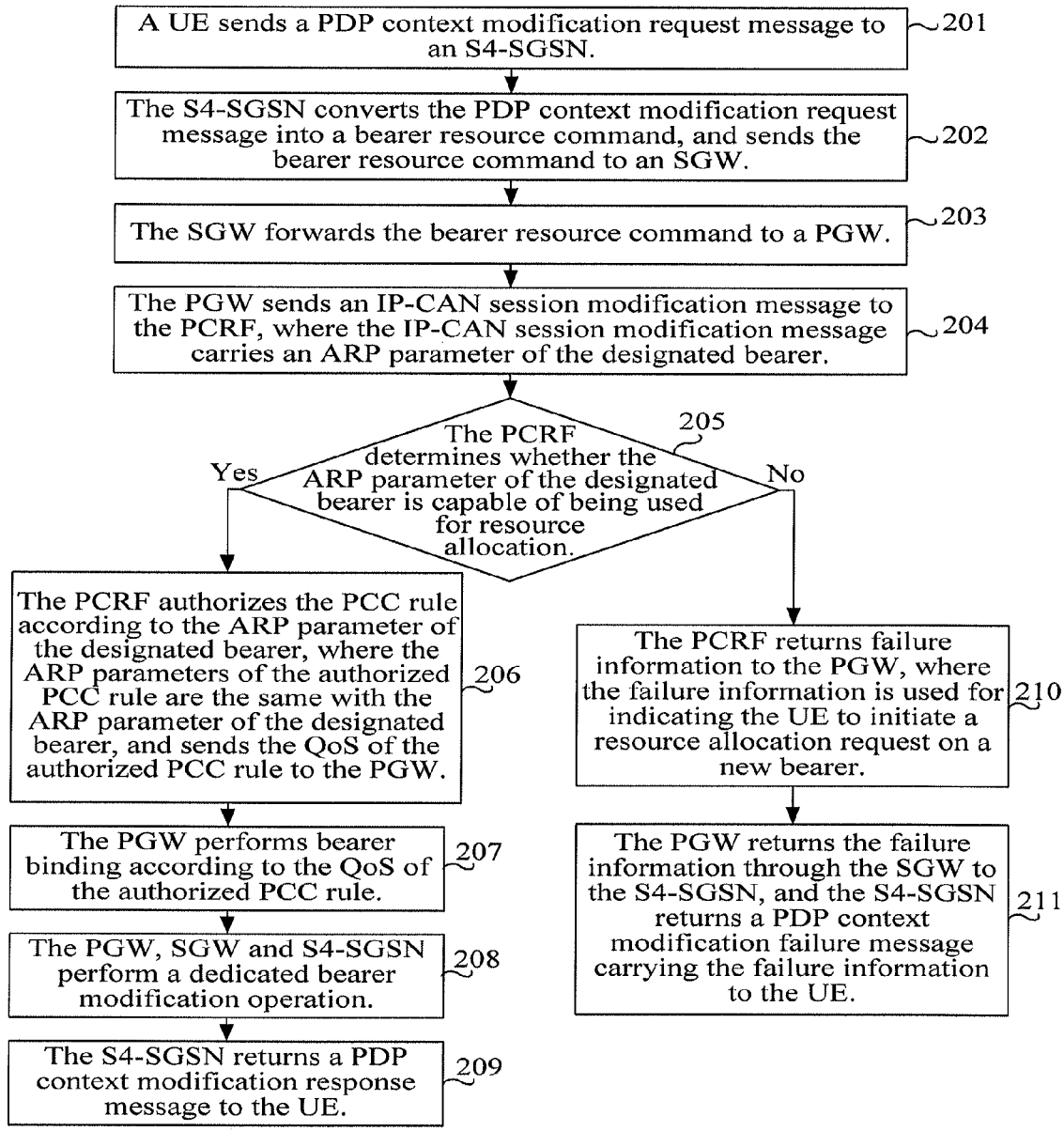
FIG. 2 is a flow chart of Embodiment 2 of a method for authorizing a policy and charging control rule provided by the present invention.

FIG. 2 is a flow chart of Embodiment 2 of a method for authorizing a policy and charging control rule provided by the present invention. This embodiment is applicable to a system architecture evolution (System Architecture Evolution, referred to as SAE for short) network of the 3GPP R8, where the UE is a hybrid mode terminal that supports both 2G and 3G networks, the PCEF is specifically a PGW, the UE is connected to an SGW and the PGW through an SGSN having an interface S4 with 3GPP anchor points (S4-SGSN), an S5 interface exists between the SGW and the PGW, and the S5 interface is based on a GPRS tunneling protocol (GPRS Tunneling Protocol, referred to as GTP for short). In this embodiment, specifically the UE initiates a processing procedure of an operation of adding a TFT on a packet data protocol (Packet Data Protocol, referred to as PDP for short) connection established on the network side.

Referring to FIG. 2, this embodiment specifically includes the following steps:

Step 201: The UE sends a PDP context modification request message to the S4-SGSN, so as to add the TFT and implement a corresponding QoS operation on the PDP connection established on the network side.

Step 202: The S4-SGSN converts the PDP context modification request message into a resource allocation request message, specifically a bearer resource command (Bearer Resource Command), and sends the bearer resource command to the SGW.

The bearer resource command carries information such as the TFT, the QoS and a bearer ID, where the bearer ID is an identifier of the PDP connection established on the network side.

Step 203: The SGW forwards the bearer resource command to the PGW.

Step 204: The PGW receives the bearer resource command, and acquires, according to the bearer ID carried in the bearer resource command, that a resource needs to be allocated on a designated bearer corresponding to the bearer ID; and the PGW sends an IP-CAN session modification message to the PCRF, where the IP-CAN session modification message carries an ARP parameter of the designated bearer.

The designated bearer in this embodiment is the PDP connection established on the network side. The IP-CAN session modification message also carries information such as the TFT and the QoS in addition to the ARP parameter of the designated bearer.

Step 205: The PCRF determines whether the ARP parameter of the designated bearer may be used for resource allocation, and if the ARP parameter of the designated bearer may be used for resource allocation, step 206 is performed; if the ARP parameter of the designated bearer may be not used for resource allocation, step 210 is performed.

Specifically, based on a service situation, the PCRF determines whether the ARP parameter of the designated bearer is applicable to the PCC rule to be authorized according to the TFT information carried in the IP-CAN session modification message, that is, determines whether the ARP parameter may be used for resource allocation.

Step 206: The PCRF authorizes the PCC rule according to the ARP parameter of the designated bearer, where the ARP parameters of the authorized PCC rule are the same as the ARP parameter of the designated bearer, and sends the QoS of the authorized PCC rule to the POW.

Step 207: The PGW performs bearer binding according to the QoS of the authorized PCC rule.

The PGW binds the authorized PCC rule and other PCC rule in the designated bearer to the designated bearer.

Step 208: Because the ARP parameters of the authorized PCC rule are the same as the existing ARP parameter of the designated bearer, the PGW, SGW and S4-SGSN perform a dedicated bearer modification operation.

Step 209: The S4-SGSN returns a PDP context modification response message to the UE. The process ends.

Step 210: The PCRF returns failure information to the PGW, where the failure information is used for indicating that the UE needs to initiate a resource allocation request on a new bearer, and optionally, the failure information may carry a cause value.

Step 211: The PGW returns the failure information through the SGW to the S4-SGSN, and the S4-SGSN returns a PDP context modification failure message carrying the failure information to the UE. The process ends.

In this embodiment, the PGW receives the resource allocation request message and sends the ARP parameter of the designated bearer to the PCRF; when the PCRF determines that the ARP parameter of the designated bearer may be used for resource allocation, the PCRF authorizes the PCC rule according to the ARP parameter of the designated bearer; and the PGW performs bearer binding according to the QoS of the authorized PCC rule. Therefore, the PCRF acquires the ARP information of the designated bearer, so that the PGW can bind the PCC rule authorized by the PCRF to the designated bearer, and the UE on the designated bearer can be successfully allocated the resource. When the PCRF determines that the ARP parameter of the designated bearer may be not used for resource allocation, the PCRF may return the failure information, indicating the UE to initiate a resource allocation request on a new bearer.

Figure 3:
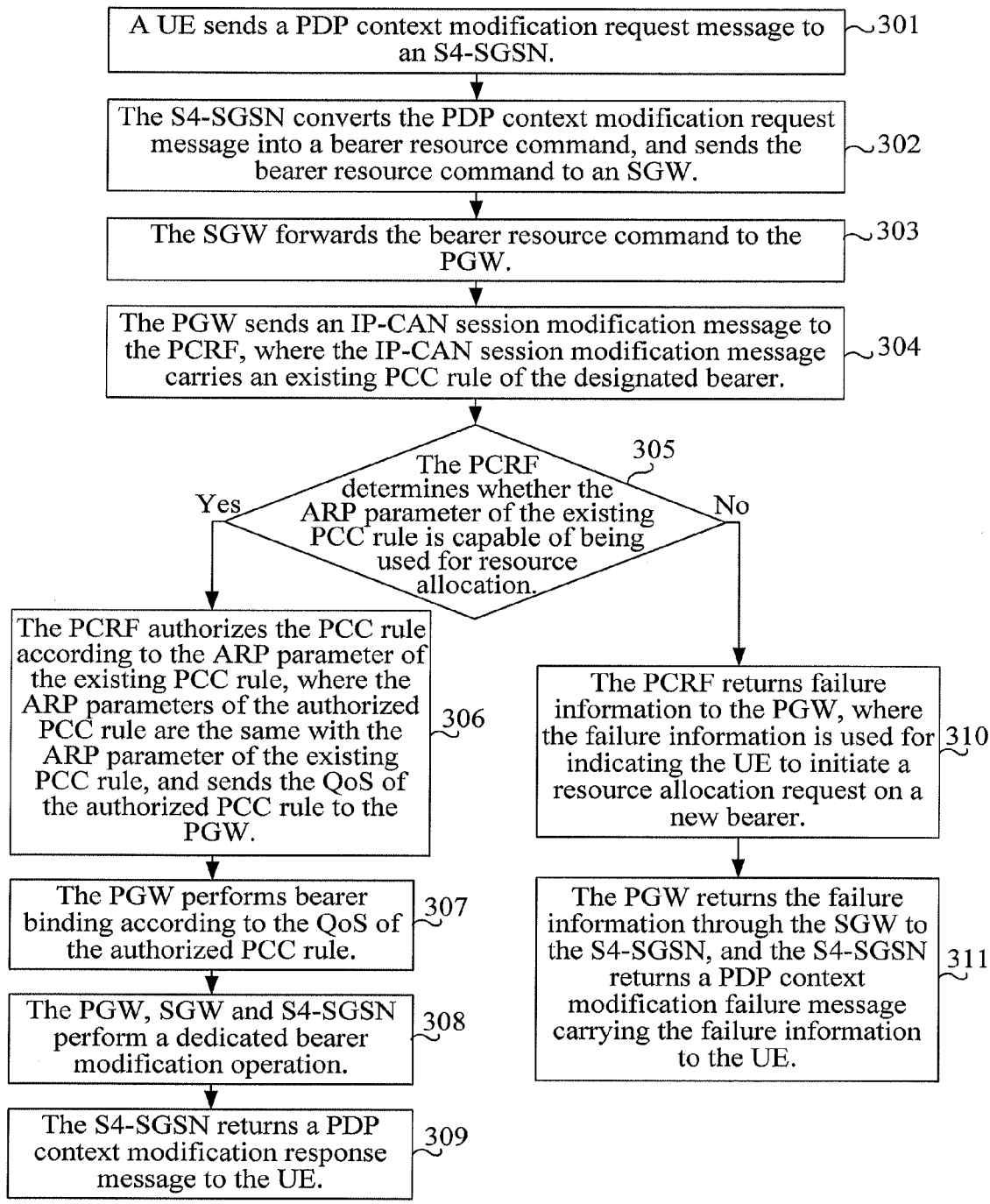
FIG. 3 is a flow chart of Embodiment 3 of a method for authorizing a policy and charging control rule provided by the present invention.

FIG. 3 is a flow chart of Embodiment 3 of a method for authorizing a policy and charging control rule provided by the present invention. The scenario applicable to this embodiment is the same as Embodiment 2, and the difference lies in that, in this embodiment, the PGW, when acquiring that a resource needs to be allocated on the designated bearer, sends an existing PCC rule in the designated bearer to the PCRF, and the PCRF considers the ARP parameter of the existing PCC rule when authorizing the PCC rule. The specific process is illustrated as follows.

Referring to FIG. 3, this embodiment specifically includes the following steps:

Step 301: A UE sends a PDP context modification request message to an S4-SGSN, so as to add a TFT and implement a corresponding QoS operation on the PDP established on the network side.

Step 302: The S4-SGSN converts the PDP context modification request message into a resource allocation request message, specifically a bearer resource command, and sends the bearer resource command to the SGW.

The bearer resource command carries information such as the TFT, the QoS and a bearer ID, where the bearer ID is an identifier of the PDP connection established on the network side.

Step 303: The SGW forwards the bearer resource command to the PGW.

Step 304: The PGW receives the bearer resource command, and acquires, according to the bearer ID carried in the bearer resource command, that a resource needs to be allocated on a designated bearer corresponding to the bearer ID; and the PGW sends an IP-CAN session modification message to the PCRF, where the IP-CAN session modification message carries an existing PCC rule in the designated bearer.

The designated bearer in this embodiment is the PDP connection established on the network side. The IP-CAN session modification message also carries information such as the TFT and the QoS in addition to the existing PCC rule.

Step 305: The PCRF acquires the ARP parameter of the existing PCC rule, and determines whether the ARP parameter may be used for resource allocation, and if the ARP parameter may be used for resource allocation, step 306 is performed; if the ARP parameter may be not used for resource allocation, step 310 is performed.

Specifically, based on a service situation, the PCRF determines whether the ARP parameter of the existing PCC rule is applicable to the PCC rule to be authorized according to the TFT information carried in the IP-CAN session modification message, that is, determines whether the ARP parameter of the existing PCC rule may be used for resource allocation.

Step 306: The PCRF authorizes the PCC rule according to the ARP parameter of the existing PCC rule, where the ARP parameters of the authorized PCC rule are the same as the ARP parameter of the existing PCC rule, and sends the QoS of the authorized PCC rule to the PGW.

Step 307: The PGW performs bearer binding according to the QoS of the authorized PCC rule.

The PGW binds the authorized PCC rule and the existing PCC rule in the designated bearer to the designated bearer.

Step 308: Because the ARP parameters of the authorized PCC rule are the same as the existing ARP parameter of the designated bearer, the PGW, SGW and S4-SGSN perform a dedicated bearer modification operation.

Step 309: The S4-SGSN returns a PDP context modification response message to the UE. The process ends.

Step 310: The PCRF returns failure information to the PGW, where the failure information is used for indicating that the UE needs to initiate a resource allocation request on a new bearer, and optionally, the failure information may carry a cause value.

Step 311: The PGW returns the failure information through the SGW to the S4-SGSN, and the S4-SGSN returns a PDP context modification failure message carrying the failure information to the UE. The process ends.

In this embodiment, the PGW receives the resource allocation request message and sends the existing PCC rule in the designated bearer to the PCRF; when the PCRF determines that the ARP parameter of the designated bearer may be used for resource allocation, the PCRF authorizes the PCC rule according to the ARP parameter of the existing PCC rule; and the PGW performs bearer binding according to the QoS of the authorized PCC rule. Therefore, the PCRF acquires the ARP information of the designated bearer, so that the PGW can bind the PCC rule authorized by the PCRF to the designated bearer, and the UE on the designated bearer can be successfully allocated the resource. When the PCRF determines that the ARP parameter of the designated bearer may be not used for resource allocation, the PCRF may return the failure information, indicating the UE to initiate a resource allocation request on a new bearer.

Figure 4:
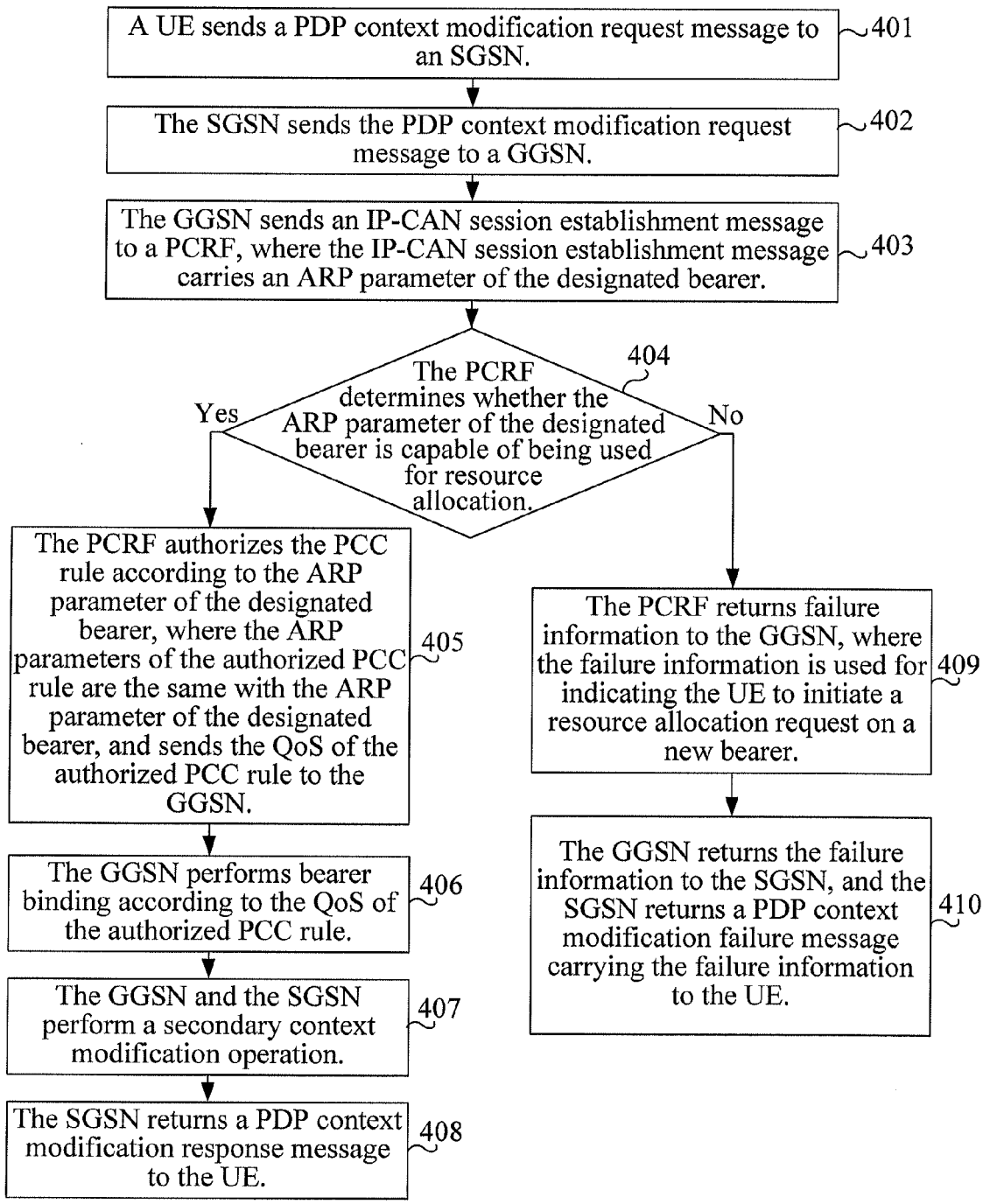
FIG. 4 is a flow chart of Embodiment 4 of a method for authorizing a policy and charging control rule provided by the present invention.

FIG. 4 is a flow chart of Embodiment 4 of a method for authorizing a policy and charging control rule provided by the present invention. This embodiment is applicable to a GPRS network of the 3GPP R8, where the UE is a hybrid mode terminal that supports both 2G and 3G networks, the PCEF is specifically a gateway GPRS support node (Gateway GPRS Support Node, referred to as GGSN for short), and the UE is connected to the GGSN through the SGSN. In this embodiment, specifically the UE initiates a processing procedure of an operation of adding a TFT on a PDP connection established on the network side, and the context modification request message is specifically a PDP context modification request message.

Referring to FIG. 4, this embodiment specifically includes the following steps:

Step 401: A UE sends a PDP context modification request message to the SGSN, so as to add the TFT and implement a corresponding QoS operation on the PDP established on the network side.

Step 402: The SGSN sends the PDP context modification request message to the GGSN.

The PDP context modification request message carries information such as the TFT, the QoS and a PDP context ID (PDP Context ID), where the PDP context ID is an identifier of the PDP connection established on the network side, and the PDP context ID indicates that the PDP context modification request message requests allocation of a resource on the designated bearer.

Step 403: The GGSN receives the PDP context modification request message, and sends an IP-CAN session establishment message to the PCRF, where the IP-CAN session establishment message carries an ARP parameter of the designated bearer.

This embodiment is applicable to a situation that the GGSN has not reported the bearer ID to the PCRF. In this step, the GGSN performs an IP-CAN bearer establishment operation, and the GGSN re-allocates the bearer ID.

The designated bearer in this embodiment is the PDP connection established on the network side. The IP-CAN session establishment message may also carry information such as the TFT, the QoS and the re-allocated bearer ID in addition to the ARP parameter of the designated bearer.

Step 404: The PCRF determines whether the ARP parameter of the designated bearer may be used for resource allocation, and if the ARP parameter of the designated bearer may be used for resource allocation, step 405 is performed; if the ARP parameter of the designated bearer may be not used for resource allocation, step 409 is performed.

Specifically, based on a service situation, the PCRF determines whether the ARP parameter of the designated bearer is applicable to the PCC rule to be authorized according to the TFT information carried in the IP-CAN session establishment message, that is, determines whether the ARP parameter of the designated bearer may be used for resource allocation.

Because the GGSN has not reported the bearer ID to the PCRF, the PCRF still does not know, according to the re-allocated bearer ID, that a resource needs to be allocated on the designated bearer, but acquires that a resource needs to be allocated on the designated bearer according to the ARP parameter of the designated bearer.

Step 405: The PCRF authorizes the PCC rule according to the ARP parameter of the designated bearer, where the ARP parameters of the authorized PCC rule are the same as the ARP parameter of the designated bearer, and sends the QoS of the authorized PCC rule to the GGSN.

Step 406: The GGSN performs bearer binding according to the QoS of the authorized PCC rule.

The GGSN binds the authorized PCC rule and other PCC rule in the designated bearer to the designated bearer.

Step 407: Because the ARP parameters of the authorized PCC rule are the same as the existing ARP parameter of the designated bearer, the GGSN and the SGSN perform a secondary context modification operation.

Step 408: The SGSN returns a PDP context modification response message to the UE. The process ends.

Step 409: The PCRF returns failure information to the GGSN, where the failure information is used for indicating that the UE needs to initiate a resource allocation request on a new bearer, and optionally, the failure information may carry a cause value.

Step 410: The GGSN returns the failure information to the SGSN, and the SGSN returns a PDP context modification failure message carrying the failure information to the UE. The process ends.

In this embodiment, the GGSN receives the resource allocation request message (which is specifically the PDP context modification request message in this embodiment) and sends the ARP parameter of the designated bearer to the PCRF; when the PCRF determines that the ARP parameter of the designated bearer may be used for resource allocation, the PCRF authorizes the PCC rule according to the ARP parameter of the designated bearer; and the GGSN performs bearer binding according to the QoS of the authorized PCC rule. Therefore, the PCRF acquires the ARP information of the designated bearer, so that the GGSN can bind the PCC rule authorized by the PCRF to the designated bearer, and the UE on the designated bearer can be successfully allocated the resource. When the PCRF determines that the ARP parameter of the designated bearer may be not used for resource allocation, the PCRF may return the failure information, indicating the UE to initiate a resource allocation request on a new bearer.

Figure 5:
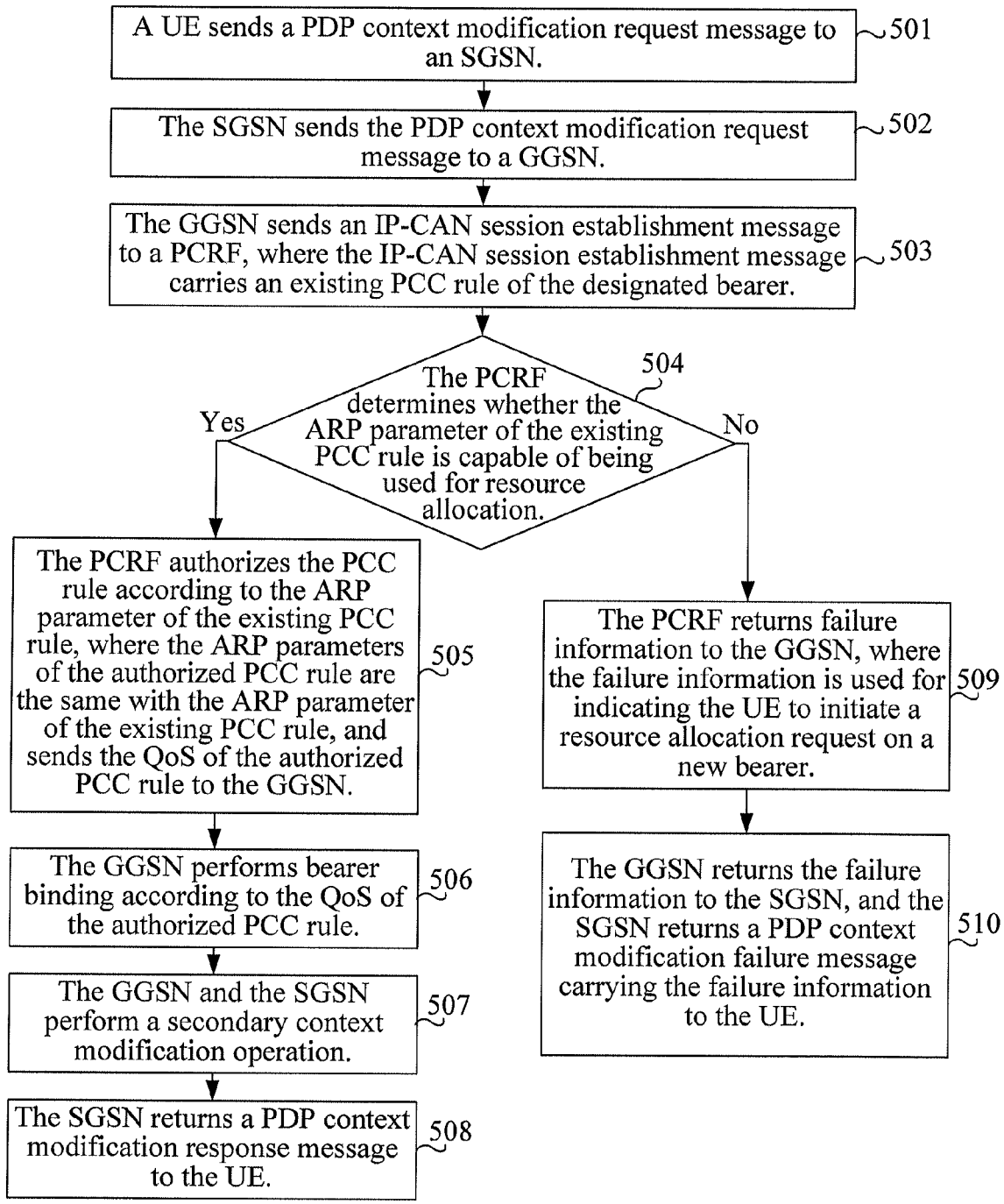
FIG. 5 is a flow chart of Embodiment 5 of a method for authorizing a policy and charging control rule provided by the present invention.

FIG. 5 is a flow chart of Embodiment 5 of a method for authorizing a policy and charging control rule provided by the present invention. The scenario applicable to this embodiment is the same as Embodiment 4, and the difference lies in that, in this embodiment, a GGSN, when acquiring that a resource needs to be allocated on the designated bearer, sends an existing PCC rule in the designated bearer to a PCRF, and the PCRF considers the ARP parameter of the existing PCC rule when authorizing the PCC rule. The specific process is illustrated as follows.

Step 501: A UE sends a PDP context modification request message to an SGSN, so as to add a TFT and implement a corresponding QoS operation on the PDP established on the network side.

Step 502: The SGSN sends the PDP context modification request message to the GGSN.

The PDP context modification request message carries information such as the TFT, the QoS and a PDP context ID, where the PDP context ID is an identifier of the PDP connection established on the network side, and the PDP context ID indicates that the PDP context modification request message requests allocation of a resource on the designated bearer.

Step 503: The GGSN receives the PDP context modification request message, and sends an IP-CAN session establishment message to the PCRF, where the IP-CAN session establishment message carries an existing PCC rule of the designated bearer.

This embodiment is applicable to a situation that the GGSN has not reported the bearer ID to the PCRF. In this step, the GGSN performs an IP-CAN bearer establishment operation, and the GGSN re-allocates the bearer ID.

The designated bearer in this embodiment is the PDP connection established on the network side. The IP-CAN session establishment message may also carry information such as the TFT, the QoS and the re-allocated bearer ID in addition to the existing PCC rule.

Step 504: The PCRF acquires the ARP parameter of the existing PCC rule, and determines whether the ARP parameter may be used for resource allocation, and if the ARP parameter may be used for resource allocation, step 505 is performed; if the ARP parameter may be not used for resource allocation, step 509 is performed.

Specifically, based on a service situation, the PCRF determines whether the ARP parameter of the existing PCC rule is applicable to the PCC rule to be authorized according to the TFT information carried in the IP-CAN session modification message, that is, determines whether the ARP parameter of the existing PCC rule may be used for resource allocation.

Because the GGSN has not reported the bearer ID to the PCRF, the PCRF still does not know, according to the re-allocated bearer ID, that a resource needs to be allocated on the designated bearer, but acquires that a resource needs to be allocated on the designated bearer according to the ARP parameter of the designated bearer.

Step 505: The PCRF authorizes the PCC rule according to the ARP parameter of the existing PCC rule, where the ARP parameters of the authorized PCC rule are the same as the ARP parameter of the existing PCC rule, and sends the QoS of the authorized PCC rule to the GGSN.

Step 506: The GGSN performs bearer binding according to the QoS of the authorized PCC rule.

The GGSN binds the authorized a PCC rule and other PCC rules in the designated bearer to the designated bearer.

Step 507: Because the ARP parameters of the authorized PCC rule are the same as the existing ARP parameter of the designated bearer, the GGSN and the SGSN perform a secondary context modification operation.

Step 508: The SGSN returns a PDP context modification response message to the UE. The process ends.

Step 509: The PCRF returns failure information to the GGSN, where the failure information is used for indicating that the UE needs to initiate a resource allocation request on a new bearer, and optionally, the failure information may carry a cause value.

Step 510: The GGSN returns the failure information to the SGSN, and the SGSN returns a PDP context modification failure message carrying the failure information to the UE. The process ends.

In this embodiment, the GGSN receives the resource allocation request message (which is specifically the PDP context modification request message in this embodiment) and sends the existing PCC rule in the designated bearer to the PCRF; when the PCRF determines that the ARP parameter of the designated bearer may be used for resource allocation, the PCRF authorizes the PCC rule according to the ARP parameter of the existing PCC rule; and the GGSN performs bearer binding according to the QoS of the authorized PCC rule. Therefore, the PCRF acquires the ARP information of the designated bearer, so that the GGSN can bind the PCC rule authorized by the PCRF to the designated bearer, and the UE on the designated bearer can be successfully allocated the resource. When the PCRF determines that the ARP parameter of the designated bearer may be not used for resource allocation, the PCRF may return the failure information, indicating the UE to initiate a resource allocation request on a new bearer.

Figure 6:
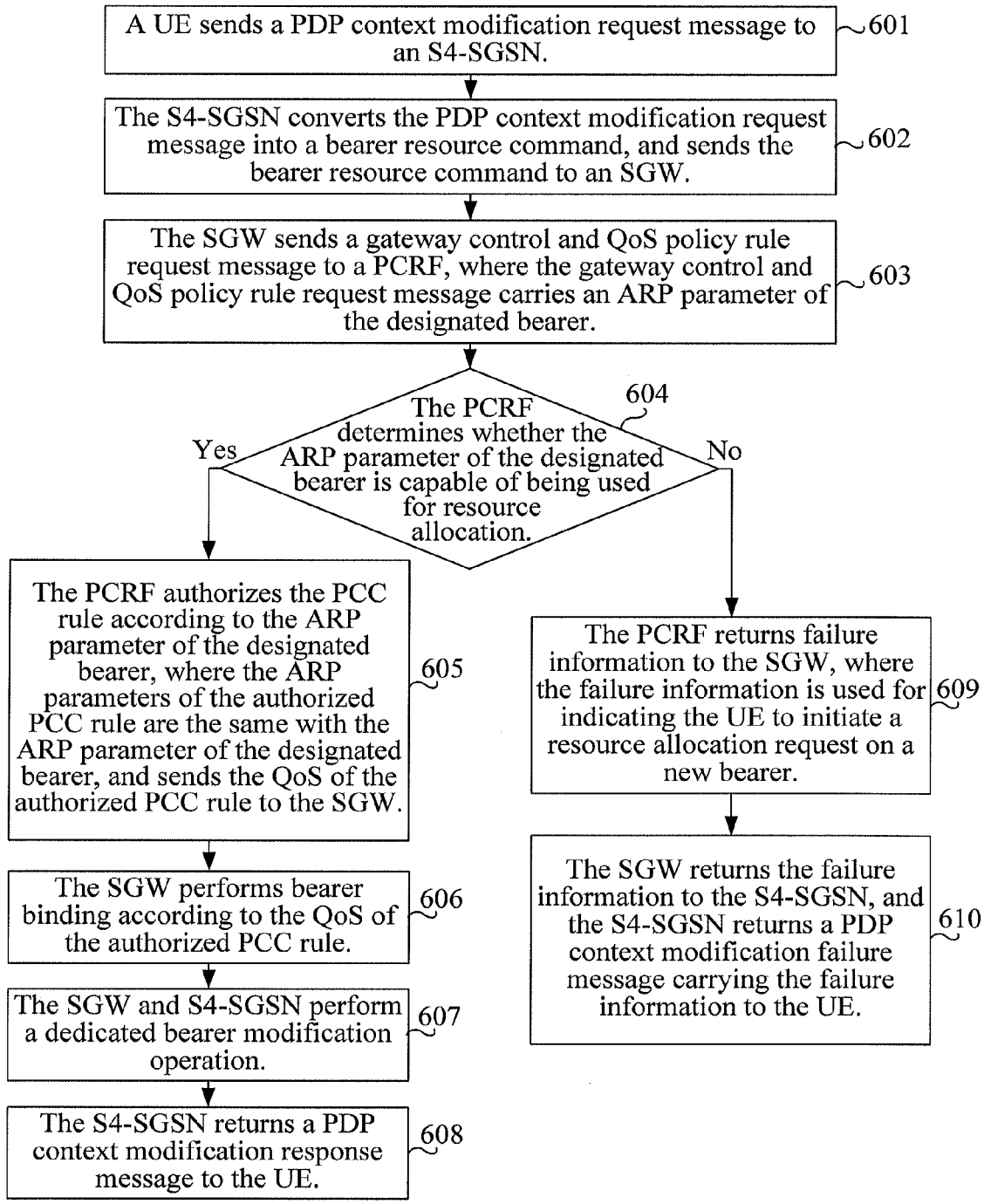
FIG. 6 is a flow chart of Embodiment 6 of a method for authorizing a policy and charging control rule provided by the present invention.

FIG. 6 is a flow chart of Embodiment 6 of a method for authorizing a policy and charging control rule provided by the present invention. This embodiment is applicable to an SAE network of the 3GPP R8, where a UE is a hybrid mode terminal that supports both 2G and 3G networks, the UE is connected to an SGW and a PGW through an SGSN having an interface S4 with 3GPP anchor points (S4-SGSN), an S5 interface exists between the SGW and the PGW, and the S5 interface is based on a proxy mobile Internet Protocol (Proxy Mobile Internet Protocol, referred to as PMIP for short). In this embodiment, a PCEF is specifically an SGW. In this embodiment, specifically the UE initiates a processing procedure of an operation of adding a TFT on a PDP connection established on the network side.

Referring to FIG. 6, this embodiment specifically includes the following steps:

Step 601: The UE sends a PDP context modification request message to the S4-SGSN, so as to add the TFT and implement a corresponding QoS operation on the PDP connection established on the network side.

Step 602: The S4-SGSN converts the PDP context modification request message into a resource allocation request message, specifically a bearer resource command, and sends the bearer resource command to the SGW.

The bearer resource command carries information such as the TFT, the QoS and a bearer ID, where the bearer ID is an identifier of the PDP connection established on the network side.

Step 603: The SGW receives the bearer resource command, and acquires, according to the bearer ID carried in the bearer resource command, that a resource needs to be allocated on a designated bearer corresponding to the bearer ID; and the SGW sends a gateway control and QoS policy rule request message to the PCRF, where the gateway control and QoS policy rule request message carries an ARP parameter of the designated bearer.

The designated bearer in this embodiment is the PDP connection established on the network side.

Step 604: The PCRF determines whether the ARP parameter of the designated bearer may be used for resource allocation, and if the ARP parameter of the designated bearer may be used for resource allocation, step 605 is performed; if the ARP parameter of the designated bearer may be not used for resource allocation, step 609 is performed.

Specifically, based on a service situation, the PCRF determines whether the ARP parameter of the designated bearer is applicable to the PCC rule to be authorized, that is, determines whether the ARP parameter of the designated bearer may be used for resource allocation.

Step 605: The PCRF authorizes the PCC rule according to the ARP parameter of the designated bearer, where the ARP parameters of the authorized PCC rule are the same as the ARP parameter of the designated bearer, and sends the QoS of the authorized PCC rule to the SGW.

Step 606: The SGW performs bearer binding according to the QoS of the authorized PCC rule.

The SGW binds the authorized PCC rule and other PCC rule in the designated bearer to the designated bearer.

Step 607: Because the ARP parameters of the authorized PCC rule are the same as the existing ARP parameter of the designated bearer, the SGW and S4-SGSN perform a dedicated bearer modification operation.

Step 608: The S4-SGSN returns a PDP context modification response message to the UE. The process ends.

Step 609: The PCRF returns failure information to the SGW, where the failure information is used for indicating that the UE needs to initiate a resource allocation request on a new bearer, and optionally, the failure information may carry a cause value.

Step 610: The SGW returns the failure information to the S4-SGSN, and the S4-SGSN returns a PDP context modification failure message carrying the failure information to the UE. The process ends.

In another implementation, the gateway control and QoS policy rule request message in step 603 may also carry an existing PCC rule in the designated bearer. In this case, step 604 may be: acquiring, by the PCRF, the ARP parameter of the existing PCC rule, and determining whether the ARP parameter may be used for resource allocation; and step 605 may be: authorizing, by the PCRF, the PCC rule according to the ARP parameter of the existing PCC rule, where the ARP parameters of the authorized PCC rule are the same as the ARP parameter of the existing PCC rule, and sending the QoS of the authorized PCC rule to the SGW.

In this embodiment, the SGW receives the resource allocation request message and sends the ARP message of the designated bearer to the PCRF; when the PCRF determines that the ARP parameter of the designated bearer may be used for resource allocation, the PCRF authorizes the PCC rule according to the ARP parameter; and the SGW performs bearer binding according to the QoS of the authorized PCC rule. Therefore, the PCRF acquires the ARP information of the designated bearer, so that the SGW can bind the PCC rule authorized by the PCRF to the designated bearer, and the UE on the designated bearer can be successfully allocated the resource. When the PCRF determines that the ARP parameter of the designated bearer may be not used for resource allocation, the PCRF may return the failure information, indicating the UE to initiate a resource allocation request on a new bearer.

Figure 7:
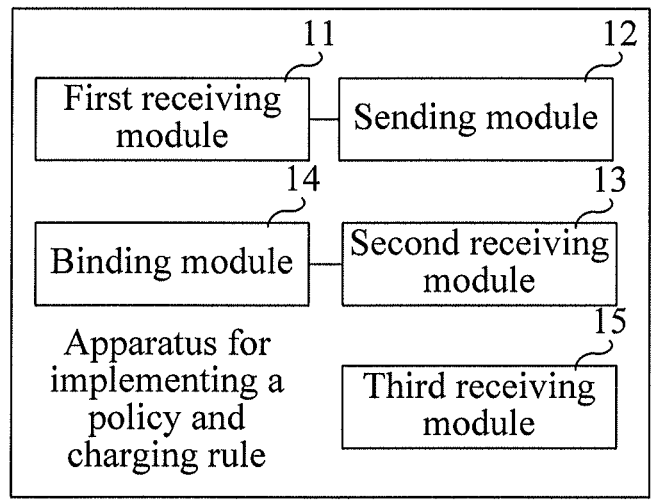
FIG. 7 is a schematic structural diagram of an embodiment of an apparatus for implementing a policy and charging rule provided by the present invention.

FIG. 7 is a schematic structural diagram of an embodiment of an apparatus for implementing a policy and charging rule provided by the present invention. This embodiment may be specifically a PCEF.

Referring to FIG. 7, this embodiment specifically includes: a first receiving module 11, a sending module 12, a second receiving module 13, and a binding module 14. The first receiving module 11 is configured to receive a resource allocation request message, where the resource allocation request message indicates that a resource is allocated on a designated bearer. The sending module 12 is configured to send, to a PCRF, ARP information of the designated bearer indicated by the resource allocation request message received by the first receiving module 11. The second receiving module 13 is configured to receive QoS of a PCC rule authorized by the PCRF according to the ARP information of the designated bearer sent by the sending module 12. The binding module 14 is configured to perform bearer binding according to the QoS of the authorized PCC rule received by the second receiving module 13.

The ARP information of the designated bearer may be specifically an ARP parameter of the designated bearer or an existing PCC rule in the designated bearer.

Further, the second receiving module 13 receives the QoS of the PCC rule authorized by the PCRF according to the ARP information of the designated bearer, when the PCRF determines that the ARP parameter of the designated bearer or the ARP parameter of the existing PCC rule sent by the sending module 12 may be used for resource allocation. This embodiment may also include a third receiving module 15, configured to receive failure information returned by the PCRF when determining that the ARP parameter of the designated bearer or the ARP parameter of the existing PCC rule sent by the sending module 12 may be not used for resource allocation, where the failure information is used for indicating a UE to initiate a resource allocation request on a new bearer.

In this embodiment, the PCEF receives the resource allocation request message and sends the ARP information of the designated bearer to the PCRF, the PCRF authorizes the PCC rule according to the ARP information of the designated bearer, and the PCEF performs bearer binding according to the QoS of the authorized PCC rule. Therefore, the PCRF acquires the ARP information of the designated bearer, so that the PCEF can bind the PCC rule authorized by the PCRF to the designated bearer, and the UE on the designated bearer can be successfully allocated the resource.

Figure 8:
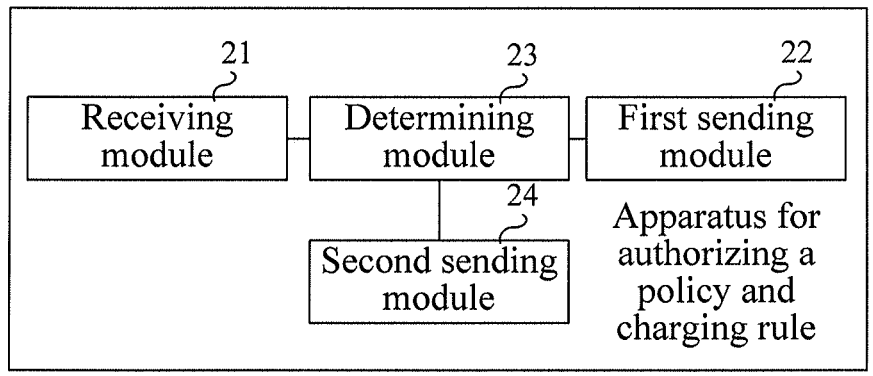
FIG. 8 is a schematic structural diagram of an embodiment of an apparatus for authorizing a policy and charging rule provided by the present invention.

FIG. 8 is a schematic structural diagram of an embodiment of an apparatus for authorizing a policy and charging rule provided by the present invention. This embodiment may be specifically a PCRF.

Referring to FIG. 8, this embodiment specifically includes a receiving module 21 and a first sending module 22. The receiving module 21 is configured to receive ARP information of a designated bearer sent by a PCEF according to a received resource allocation request message, where the resource allocation request message indicates that a resource is allocated on the designated bearer. The first sending module 22 is configured to send, to the PCEF, QoS of a PCC rule authorized according to the ARP information of the designated bearer received by the receiving module 21.

The ARP information of the designated bearer may be specifically an ARP parameter of the designated bearer or an existing PCC rule in the designated bearer.

Further, this embodiment may also include a determining module 23, configured to determine whether the ARP parameter of the designated bearer or the ARP parameter of the existing PCC rule received by the receiving module 21 may be used for resource allocation. The first sending module 22 is specifically configured to send, to the PCEF, the QoS of the PCC rule authorized according to the ARP information of the designated bearer received by the receiving module 21, when the determining module 23 determines that the ARP parameter of the designated bearer or the ARP parameter of the existing PCC rule may be used for resource allocation, so that the PCEF is enabled to perform bearer binding according to the QoS of the authorized PCC rule.

This embodiment may also include a second sending module 24, configured to, when the determining module 23 determines that the ARP parameter of the designated bearer or the ARP parameter of the existing PCC rule received by the receiving module 21 may be not used for resource allocation, send failure information to the PCEF, where the failure information is used for indicating a UE to initiate a resource allocation request on a new bearer.

In this embodiment, the PCRF receives the ARP information of the designated bearer sent by the PCEF according to the received resource allocation request message, and sends to the PCEF the QoS of the PCC rule authorized according to the ARP information of the designated bearer, so that the PCEF is enabled to perform bearer binding according to the QoS of the authorized PCC rule. Therefore, the PCRF acquires the ARP information of the designated bearer, so that the PCEF can bind the PCC rule authorized by the PCRF to the designated bearer, and the UE on the designated bearer can be successfully allocated the resource.

Figure 9:
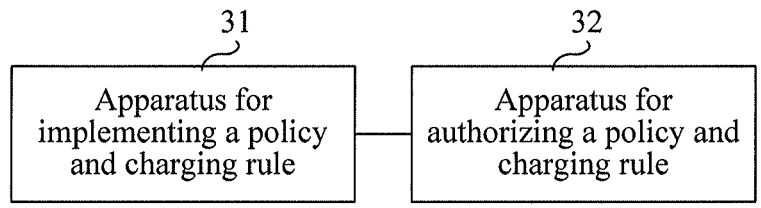
FIG. 9 is a schematic structural diagram of an embodiment of a system for authorizing a policy and charging control rule provided by the present invention.

FIG. 9 is a schematic structural diagram of an embodiment of a system for authorizing a policy and charging control rule provided by the present invention. Referring to FIG. 9, this embodiment specifically includes an apparatus for implementing a policy and charging rule 31 and an apparatus for authorizing a policy and charging rule 32.

The apparatus for implementing a policy and charging rule 31 is configured to receive a resource allocation request message, where the resource allocation request message indicates that a resource is allocated on a designated bearer; send, to the apparatus for authorizing a policy and charging rule 32, ARP information of the designated bearer; receive QoS of a PCC rule authorized by the apparatus for authorizing a policy and charging rule 32 according to the ARP information of the designated bearer; and perform bearer binding according to the QoS of the authorized PCC rule, The apparatus for authorizing a policy and charging rule 32 is configured to receive the ARP information of the designated bearer sent by the apparatus for implementing a policy and charging rule 31 according to the received resource allocation request message, where the resource allocation request message indicates that a resource is allocated on a designated bearer; and send, to the apparatus for implementing a policy and charging rule 31, QoS of the PCC rule authorized according to the ARP information of the designated bearer, so that the apparatus for implementing a policy and charging rule 31 is enabled to perform bearer binding according to the QoS of the authorized PCC rule.

Reference can be made to the apparatus embodiments for the specific structures of the apparatus for implementing a policy and charging rule 31 and the apparatus for authorizing a policy and charging rule 32 in this embodiment, which will not be described in detail herein.

In this embodiment, the apparatus for implementing a policy and charging rule receives the resource allocation request message, and sends, to the apparatus for authorizing a policy and charging rule, the ARP information of the designated bearer; the apparatus for authorizing a policy and charging rule authorizes the PCC rule according to the ARP information of the designated bearer; and the apparatus for implementing a policy and charging rule performs bearer binding according to the QoS of the authorized PCC rule. Therefore, the apparatus for authorizing a policy and charging rule acquires the ARP information of the designated bearer, so that the apparatus for implementing a policy and charging rule can bind the PCC rule authorized by the apparatus for authorizing a policy and charging rule to the designated bearer, and the UE on the designated bearer can be successfully allocated the resource.

Persons skilled in the art should understand that all or a part of the steps of the methods according to the embodiments of the present invention may be implemented by a program instructing relevant hardware. The program may be stored in a computer readable storage medium. When the program is run, the steps of the methods according to the embodiments are performed. The storage medium may be any medium that is capable of storing program codes, such as a ROM, a RAM, a magnetic disk, or an optical disk.

Finally, it should be noted that the above embodiments are merely provided for describing the technical solutions of the present invention, but not intended to limit the present invention. It should be understood by persons skilled in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and protection scope of the present invention.

What is claimed is:

1. A method for authorizing a policy and charging control rule, comprising:
receiving, by a Policy and Charging Enforcement Function (PCEF), a resource allocation request message, wherein the resource allocation request message indicates that a resource is allocated on a designated bearer;
sending, by the PCEF, Allocation and Retention Priority (ARP) information of the designated bearer to a Policy and Charging Rule Function (PCRF), wherein the ARP information of the designated bearer is an ARP parameter of the designated bearer; and
receiving, by the PCEF, Quality of Service (QoS) of a Policy and Charging Control (PCC) rule authorized by the PCRF when the PCRF determines that the ARP parameter of the designated bearer is available for resource allocation, wherein ARP parameter of the authorized PCC rule is the same as the ARP parameter of the designated bearer, and performing bearer binding according to the QoS of the authorized PCC rule.

2. The method for authorizing a policy and charging control rule according to claim 1, further comprising: receiving, by the PCEF, failure information returned by the PCRF when the PCRF determines that the ARP parameter of the designated bearer is unavailable for resource allocation, wherein the failure information is used for indicating that a user terminal needs to initiate a resource allocation request on a new bearer.

3. The method for authorizing a policy and charging control rule according to claim 1, wherein in a System Architecture Evolution (SAE) network, the resource allocation request message is a bearer resource command; and in a General Packet Radio Service (GPRS) network, the resource allocation request message is a context modification request message.

4. A non-transitory computer readable storage medium encoded with computer program stored thereon for:
receiving a resource allocation request message, wherein the resource allocation request message indicates that a resource is allocated on a designated bearer;
sending Allocation and Retention Priority (ARP) information of the designated bearer to a Policy and Charging Rule Function (PCRF), wherein the ARP information of the designated bearer is an ARP parameter of the designated bearer; and
receiving Quality of Service (QoS) of a Policy and Charging Control (PCC) rule authorized by the PCRF when the PCRF determines that the ARP parameter of the designated bearer is available for resource allocation, wherein ARP parameter of the authorized PCC rule is the same as the ARP parameter of the designated bearer, and performing bearer binding according to the QoS of the authorized PCC rule.

5. A non-transitory computer readable storage medium encoded with computer program stored thereon for:

receiving Allocation and Retention Priority (ARP) information of a designated bearer sent by a Policy and Charging Enforcement Function (PCEF) according to a received resource allocation request message, wherein the ARP information of the designated bearer is an ARP parameter of the designated bearer, wherein the resource allocation request message indicates that a resource is allocated on the designated bearer; and sending, to the PCEF, Quality of Service (QoS) of a Policy and Charging Control (PCC) rule authorized when determining that the ARP parameter of the designated bearer is available for resource allocation, wherein ARP parameter of the authorized PCC rule is the same as the ARP parameter of the designated bearer.

6. A method for authorizing a policy and charging control rule, comprising:

receiving, by a Policy and Charging Enforcement Function (PCEF), a resource allocation request message, wherein the resource allocation request message indicates that a resource is allocated on a designated bearer;

sending, by the PCEF, Allocation and Retention Priority (ARP) information of the designated bearer to a Policy and Charging Rule Function (PCRF), wherein the ARP information of the designated bearer is an existing Policy and Charging Control (PCC) rule in the designated bearer; and receiving, by the PCEF, Quality of Service (QoS) of a PCC rule authorized by the PCRF when the PCRF determines that ARP parameter of the existing PCC rule is available for resource allocation, wherein ARP parameter of the authorized PCC rule is the same as the ARP parameter of the existing PCC rule, and performing bearer binding according to the QoS of the authorized PCC rule.

7. The method for authorizing a policy and charging control rule according to claim 6, further comprising: receiving, by the PCEF, failure information returned by the PCRF when the PCRF determines that the ARP parameter of the existing PCC rule is unavailable for resource allocation, wherein the failure information is used for indicating that a user terminal needs to initiate a resource allocation request on a new bearer.

8. A non-transitory computer readable storage medium encoded with computer program stored thereon for:

receiving a resource allocation request message, wherein the resource allocation request message indicates that a resource is allocated on a designated bearer;

sending Allocation and Retention Priority (ARP) information of the designated bearer to a Policy and Charging Rule Function (PCRF), wherein the ARP information of the designated bearer is an existing Policy and Charging Control (PCC) rule in the designated bearer; and receiving Quality of Service (QoS) of a PCC rule authorized by the PCRF when the PCRF determines that ARP parameter of the existing PCC rule is available for resource allocation, wherein ARP parameter of the authorized PCC rule is the same as the ARP parameter of the existing PCC rule, and performing bearer binding according to the QoS of the authorized PCC rule.

9. A non-transitory computer readable storage medium encoded with computer program stored thereon for:

receiving Allocation and Retention Priority (ARP) information of a designated bearer sent by a Policy and Charging Enforcement Function (PCEF) according to a received resource allocation request message, wherein the ARP information of the designated bearer is an existing Policy and Charging Control (PCC) rule in the designated bearer, wherein the resource allocation request message indicates that a resource is allocated on the designated bearer; and sending, to the PCEF, Quality of Service (QoS) of a PCC rule authorized when determining that ARP parameter of the existing PCC rule is available for resource allocation, wherein ARP parameter of the authorized PCC rule is the same as the ARP parameter of the existing PCC rule.

* * * * *